US012510917B2

United States Patent
(12) United States Patent
Krishnan et al.

(10) Patent No.: US 12,510,917 B2
(45) Date of Patent: Dec. 30, 2025

(54) PORTABLE COMMUNICATION DEVICE WITH KNOB ROTATION LOCKING MECHANISM

(71) Applicant: MOTOROLA SOLUTIONS, INC., Chicago, IL (US)

(72) Inventors: Arun Krishnan, Hilbert (AU); Goktug Duman, Miami, FL (US); Thomas Pope, Joondanna (AU)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 232 days.

(21) Appl. No.: 18/503,758

(22) Filed: Nov. 7, 2023

(65) Prior Publication Data

US 2025/0147539 A1 May 8, 2025

(51) Int. Cl.

*G05G 5/08* (2006.01)
*G05G 1/01* (2008.04)
*G05G 1/02* (2006.01)
*G05G 1/10* (2006.01)

(52) U.S. Cl.

CPC ................ *G05G 5/08* (2013.01); *G05G 1/01* (2013.01); *G05G 1/02* (2013.01); *G05G 1/10* (2013.01)

(58) Field of Classification Search

CPC .. G05G 5/08; G05G 1/01; G05G 1/02; G05G 1/10; H01H 3/02; H01H 3/54; H01H 3/58; H01H 9/24; H01H 9/26

See application file for complete search history.

(56) References Cited

U.S. PATENT DOCUMENTS

| | | | | |
|---|---|---|---|---|
| 4,295,012 A * | 10/1981 | Keeler | ........................ | B41J 5/20 200/5 B |
| 5,646,382 A * | 7/1997 | Moriya | .................. | H01H 13/72 200/5 E |
| 9,182,773 B2 | 11/2015 | Campean | | |
| 9,295,467 B2 | 3/2016 | Scirica | | |
| 2011/0100152 A1 | 5/2011 | Huynh | | |
| 2021/0048846 A1 | 2/2021 | Hinson | | |
| 2023/0115511 A1 | 4/2023 | Ito et al. | | |

OTHER PUBLICATIONS

Australian Patent Office Action for Application No. 2024219339 dated Aug. 15, 2025 (7 pages).

* cited by examiner

*Primary Examiner* — Lheiren Mae A Caroc

(74) *Attorney, Agent, or Firm* — Michael Best & Friedrich LLP

(57) ABSTRACT

A portable communication device includes a main housing, and a knob coupled to the main housing. The knob is rotatable about a first axis that extends into the main housing, and the knob includes a channel that extends partially circumferentially about the first axis. The portable communication device also includes a button coupled to the main housing. The button is moveable linearly along a second axis that is parallel to the first axis, and the button includes a projection that is sized and shaped to extend into the channel. The button is movable between a first position in which the projection is within the channel, and a second position in which the projection is outside of the channel.

20 Claims, 9 Drawing Sheets

PORTABLE COMMUNICATION DEVICE WITH KNOB ROTATION LOCKING MECHANISM

BACKGROUND

Portable radios commonly include rotatable control knobs (e.g., volume control knobs and other knobs) for controlling one or more features on the portable radios. These knobs are typically located along a top or side of the portable radio.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments, examples, aspects, and features of concepts that include the claimed subject matter, and to explain various principles and advantages of those embodiments, examples, aspects, and features.

Figure 1:
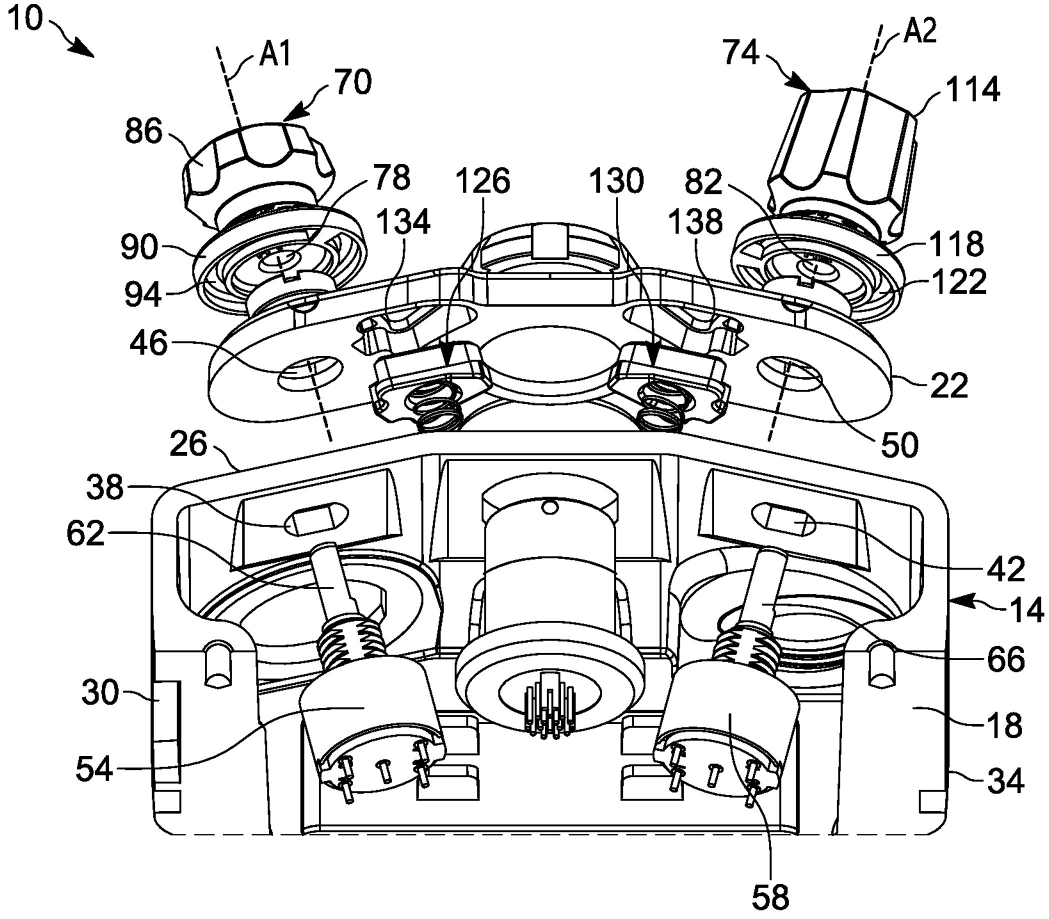
FIG. 1 is a perspective, exploded view of a portion of a portable communication device according to one example.

Skilled artisans will appreciate that elements in the figures are illustrated for simplicity and clarity and have not necessarily been drawn to scale. For example, the dimensions of some of the elements in the figures may be exaggerated relative to other elements to help improve understanding of the examples, aspects, and features presented in this disclosure.

The system, apparatus, and method components have been represented where appropriate by conventional symbols in the drawings, showing only those specific details that are pertinent to understanding of the various embodiments, examples, aspects, and features of the present disclosure so as not to obscure the disclosure with details that will be readily apparent to those of ordinary skill in the art having the benefit of the description herein.

DETAILED DESCRIPTION OF THE INVENTION

Control knobs often have a particular rotational position, such as an OFF position for a volume control knob, that is intended to be avoided in certain environments or situations (e.g., in a military environment). In these environments or situations, it is not desirable for the control knob to be accidentally turned to this rotational position, unless intended so. However, accidental activation of the control knob may take place if a user accidentally brushes up against and/or otherwise rotates the control knob to the rotational position. Thus, there exists a need for an improved technical method, device, and system for a portable communication device with a knob rotation locking mechanism to inhibit or prevent a control knob from moving to the rotational position.

One example provides a portable communication device having a main housing, and a knob coupled to the main housing. The knob is rotatable about a first axis that extends into the main housing, and the knob includes a channel that extends partially circumferentially about the first axis. The portable communication device also includes a button coupled to the main housing. The button is moveable linearly along a second axis that is parallel to the first axis, and the button includes a projection that is sized and shaped to extend into the channel. The button is movable between a first position in which the projection is within the channel, and a second position in which the projection is outside of the channel.

Further advantages and features consistent with this disclosure will be set forth in the following detailed description, with reference to the figures.

Referring now to the drawings, and in particular FIG. 1, a portable communication device 10 is provided. In the illustrated example, the portable communication device 10 is a portable handheld radio, although in other examples the portable communication device 10 may be a different type of radio, or a different type of portable communication device (e.g., phone, tablet, and the like).

The portable communication device 10 includes a main housing 14 that houses at least one component therein (e.g., at least one electronic component), and defines an exterior of the portable communication device 10. In the illustrated example, the main housing 14 includes a first (e.g., lower) housing 18, and a second (e.g., upper) housing 22 coupled to an exterior of the first housing 18. The first housing 18 defines an upper wall 26, a first side wall 30 extending from the upper wall 26, and a second side wall 34 extending from the upper wall 26. The upper wall 26 includes a first opening 38, and a second opening 42.

The second housing 22 is a bezel, and extends over at least a portion of the upper wall 26. The second housing 22 includes a third opening 46, and a fourth opening 50. The second housing 22 is sized and shaped such that the third opening 46 is positioned over the first opening 38, and the fourth opening 50 is positioned over the second opening 42. In other examples, the main housing 14 includes only a single housing (e.g., the first housing 18), or includes more than two housings (e.g., more than one bezel).

With continued reference to FIG. 1, in the illustrated example the portable communication device 10 includes a first rotary encoder 54 housed within the first housing 18, and a second rotary encoder 58 housed within the first housing 18. A first encoder shaft 62 extends from the first rotary encoder 54, and passes through the first opening 38 and the third opening 46. A second encoder shaft 66 extends from the second rotary encoder 58, and passes through the second opening 42 and the fourth opening 50. In other examples, the portable communication device 10 may include a rotary switch(es), or potentiometer(s), or other device(s) for detecting rotation, in place of the first rotary encoder 54 and/or the second rotary encoder 58. The first housing 18 may also house various other electronic components, other than the first rotary encoder 54 and the second rotary encoder 58 (e.g., a printed circuit board, an antenna, and the like). In some examples, the first rotary encoder 54 and the second rotary encoder 58 are each coupled to a printed circuit board and/or controller within the first housing 18.

The portable communication device 10 also includes at least one rotatable knob for controlling a feature or features on the portable communication device 10. In the illustrated example, the portable communication device 10 includes a first knob 70 positioned above the second housing 22, and a second knob 74 positioned above the second housing 22. The first knob 70 is a volume control knob, and the second knob 74 is a presets control knob. Other examples include different types of knobs than that illustrated, as well as different numbers and positions of knobs than that illustrated.

With continued reference to FIG. 1, the first knob 70 is coupled to the main housing 14, and is rotatable about an axis A1 that extends into the main housing 14. The first knob 70 includes a first shaft opening 78 (e.g., a central shaft opening) that is sized and shaped to receive the first encoder shaft 62. The axis A1 extends (e.g., centrally) through the first shaft opening 78 and through the first encoder shaft 62. The first knob 70 may be rotationally fixed to the first encoder shaft 62, such that rotation of the first knob 70 about the axis A1 generates corresponding rotation of the first encoder shaft 62, thereby permitting detection of a degree of rotation of the first knob 70. As noted above, various other mechanisms (e.g., a rotary switch, potentiometer, and the like) may alternatively be used to detect a degree of rotation of the first knob 70.

The second knob 74 is also coupled to the main housing 14, and is rotatable about an axis A2 that extends into the main housing 14. The second knob 74 includes a second shaft opening 82 (e.g., a central shaft opening) that is sized and shaped to receive the second encoder shaft 66. The axis A2 extends (e.g., centrally) through the second shaft opening 82 and the second encoder shaft 66. The second knob 74 may be rotationally fixed to the second encoder shaft 66, such that rotation of the second knob 74 about the axis A2 generates corresponding rotation of the second encoder shaft 66, thereby permitting detection of a degree of rotation of the second knob 74. As noted above, various other mechanisms (e.g., a rotary switch, potentiometer, and the like) may alternatively be used to detect a degree of rotation of the second knob 74.

Figure 2:
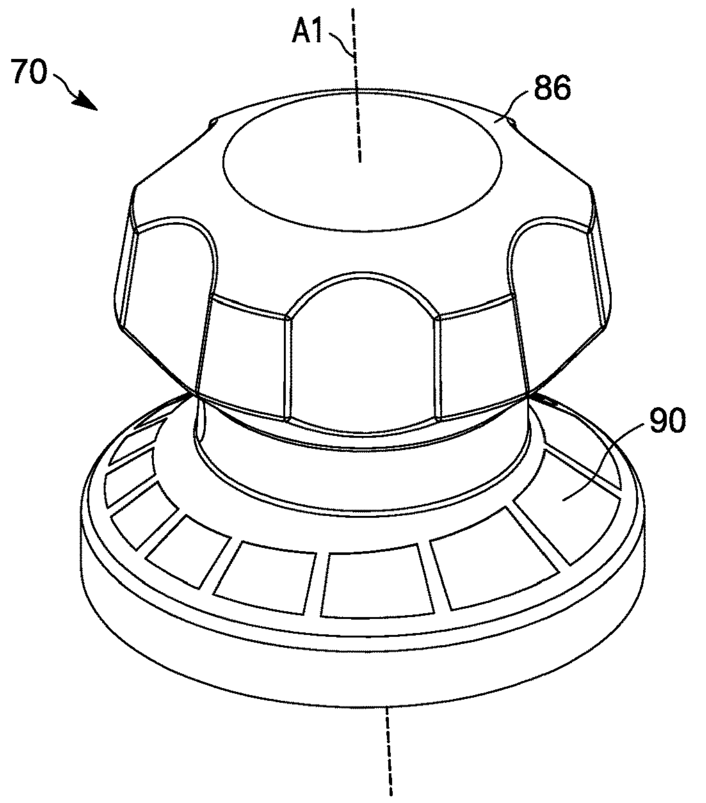
FIG. 2 is a top perspective view of a knob of the portable communication device.
Figure 3:
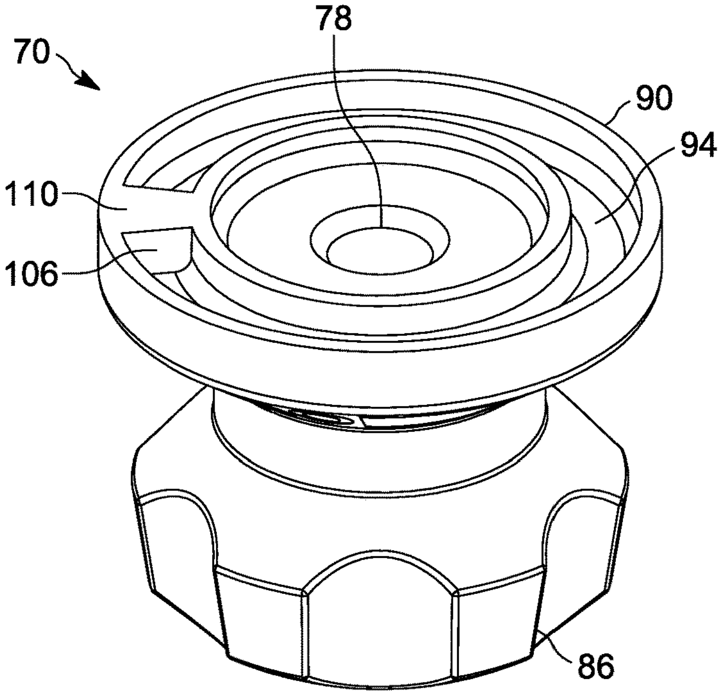
FIG. 3 is a bottom perspective view of the knob.
Figure 4:
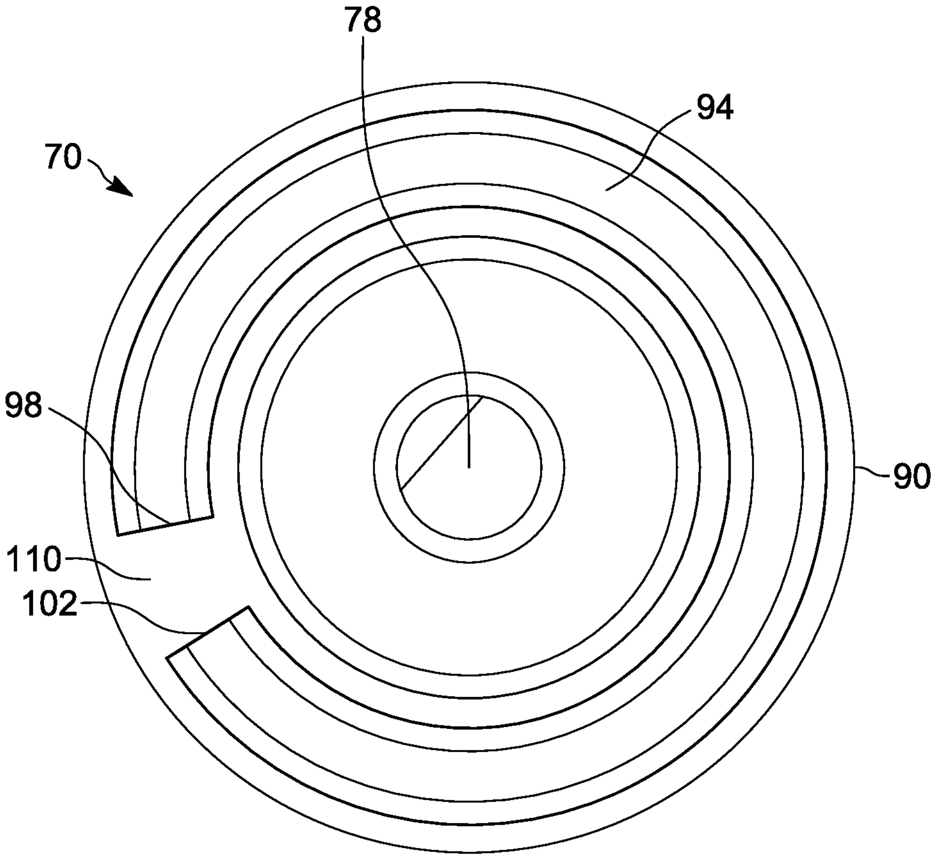
FIG. 4 is a bottom view of the knob, illustrating a channel.
Figure 5:
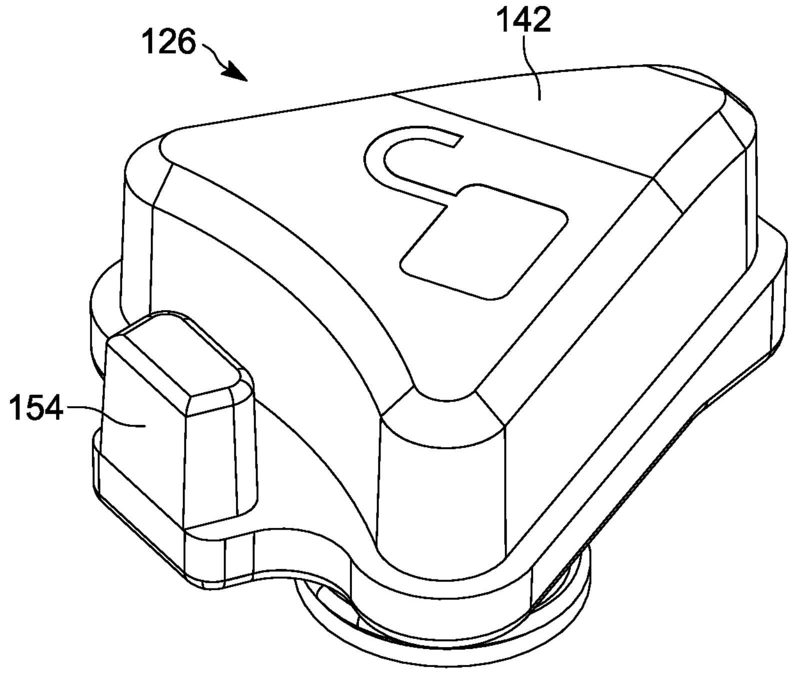
FIG. 5 is a top perspective view of a button of the portable communication device.
Figure 6:
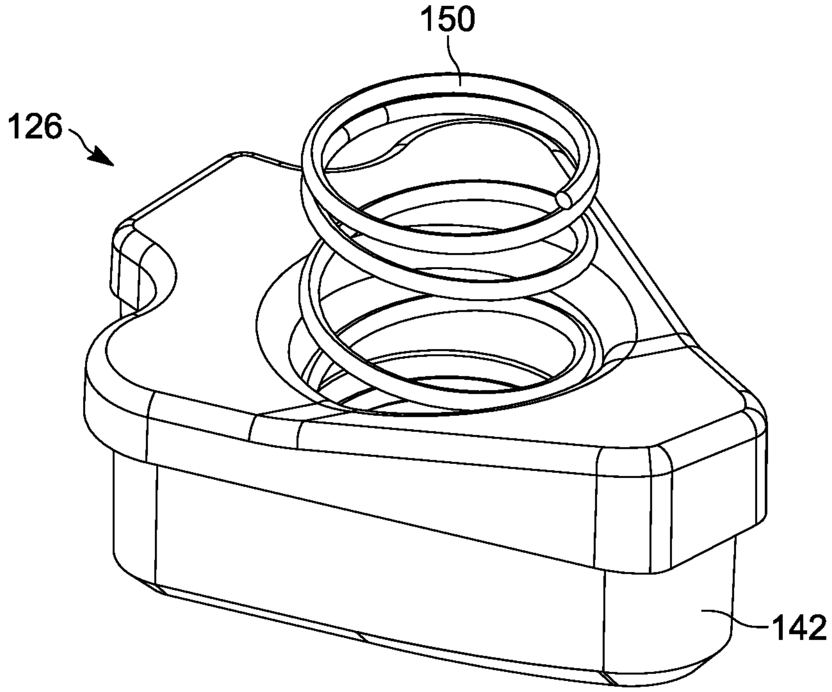
FIG. 6 is a bottom perspective view of the button.
Figure 7:
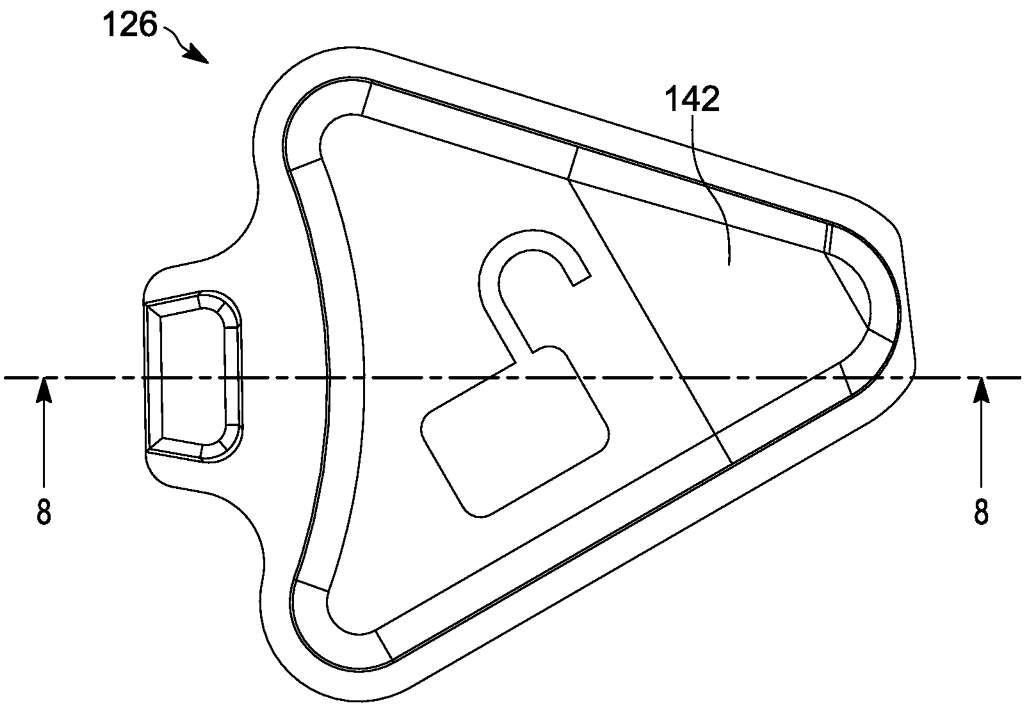
FIG. 7 is a top view of the button.
Figure 8:
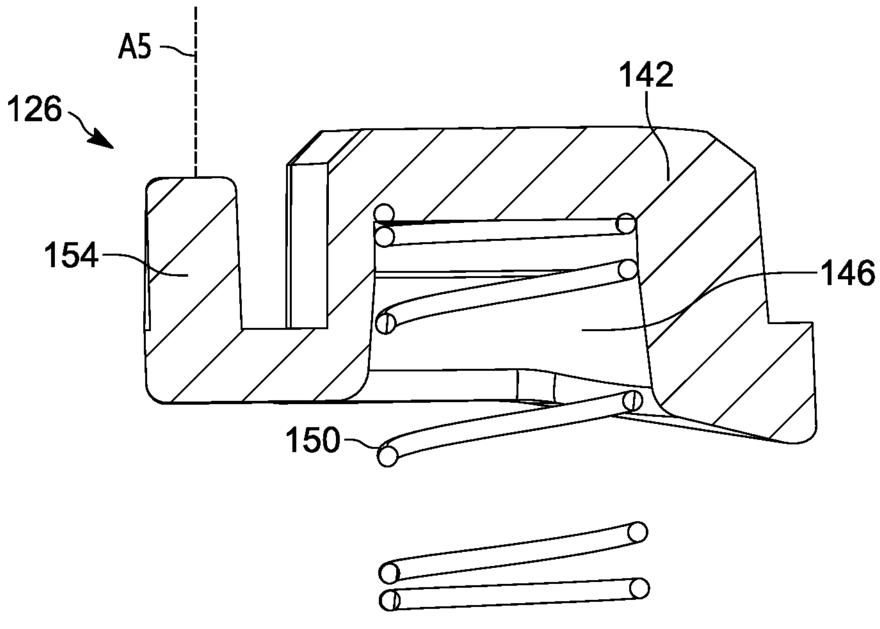
FIG. 8 is a cross-sectional view of the button, taken along lines 8-8 in FIG. 7, illustrating a projection.

With reference to FIGS. 2-4, the first knob 70 includes a first section 86 sized and shaped to be gripped to rotate the first knob 70, and a second section 90 positioned opposite the first section 86 along the axis A1. As illustrated in FIGS. 2 and 3, the first section 86 includes, for example, indentations, protrusion, or other exterior regions for gripping the first knob 70. As illustrated in FIG. 2, the second section 90 includes markings, symbols, or other structures indicating rotational positions (e.g., volume settings). In other examples, the first section 86 does not include any regions for gripping, and/or the second section 90 does not include markings, symbols, or other structures indicating rotational positions. Other examples of the first knob 70 include different shapes, sizes, and/or configurations of surfaces or exterior regions on the first section 86 and/or the second section 90 than that illustrated.

With reference to FIGS. 1, 3, and 4, the first knob 70 also includes a channel 94 disposed in the second section 90. As illustrated in FIGS. 3 and 4, the channel 94 extends partially circumferentially around the axis A1 (e.g., extends greater than 180 degrees and less than 360 degrees around the axis A1, greater than 270 degrees and less than 360 degrees around the axis A1, greater than 315 degrees and less than 360 degrees around the axis A1, or other values and ranges of values). In the illustrated example, the channel 94 also extends partially circumferentially around the first shaft opening 78. As seen in FIG. 1, the channel 94 also faces the main housing 14, and is positioned above (e.g., directly above) the second housing 22 of the main housing 14.

With continued reference to FIGS. 3 and 4, the channel 94 includes a first end 98 and a second end 102. The channel 94 extends circumferentially from the first end 98 to the second end 102. The first knob 70 also includes a first rib 106 that separates the first end 98 from the second end 102. The first rib 106 defines an outer (e.g., lower) surface 110. The channel 94 has a generally constant width, and depth, as it extends circumferentially about the axis A1, although other examples include channels 94 with shapes other than that illustrated (e.g., channels 94 having a width or depth that changes as the channel 94 extends circumferentially about the axis A1). Additionally, in the illustrated example the outer surface 110 is generally flush with a remaining lower surface of the first knob 70. In other examples, the outer surface 110 may be elevated, or recessed, relative to other portions of a lower surface of the first knob 70.

With reference to FIG. 1, the second knob 74 similarly includes a first section 114 sized and shaped to be gripped to rotate the second knob 74, and a second section 118 positioned opposite the first section 86 along the axis A2. The second knob 74 also similarly includes a channel 122 disposed in the second section 118 that extends partially circumferentially around the axis A2.

Figure 9:
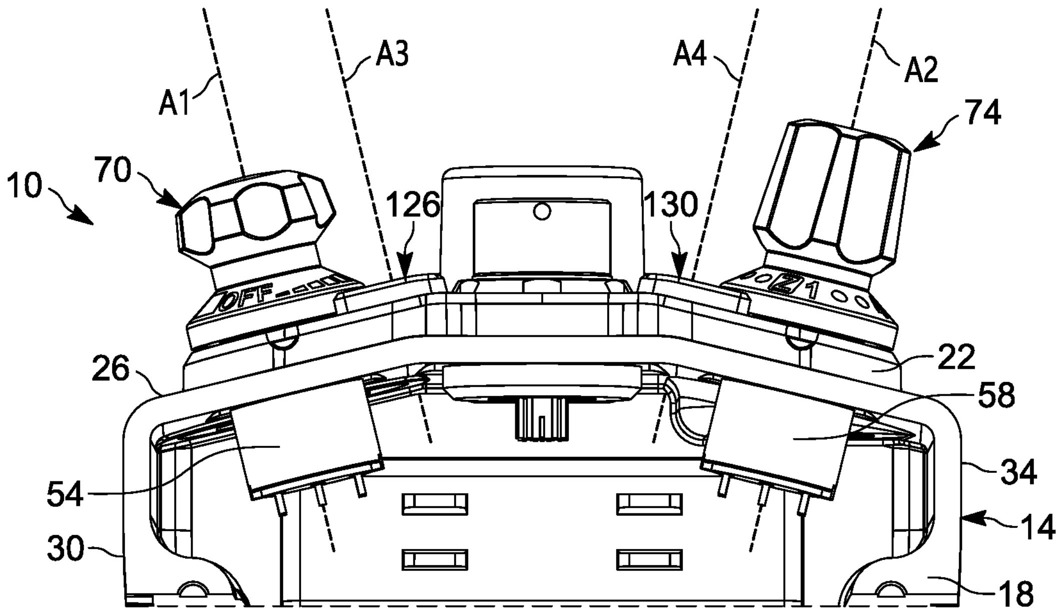
FIG. 9 is a front view of the portable communication device, with the button in a first position.

With continued reference to FIGS. 1 and 9, the portable communication device 10 includes at least one button coupled to the main housing 14. In the illustrated example, the portable communication device 10 includes a first button 126 coupled to the main housing 14 (e.g., adjacent the first knob 70), and a second button 130 coupled to the main housing 14 (e.g., adjacent the second knob 74). The second housing 22 (e.g., the bezel) includes a fifth opening 134 sized and shaped to receive the first button 126, and a sixth opening 138 sized and shaped to receive the second button 130. The first button 126 is moveable linearly (and within the fifth opening 134) along an axis A3 (FIG. 9). In some examples, the axis A3 is parallel to the axis A1. The second button 130 is moveable linearly (and within the sixth opening 138) along an axis A4 (FIG. 9). In some examples, the axis A4 is parallel to the axis A2.

The description provided below focuses further on the first button 126 and its operation with the first knob 70. However, it is understood that the second button 130 may operate in an identical manner with the second knob 74, and that the portable communication device 10 may include any number of knobs and corresponding buttons as described herein.

With reference to FIGS. 5-8, the first button 126 includes a main body 142 that defines a cavity 146. A spring 150 (e.g., a compression spring, leaf spring, or other type of biasing element) is positioned partially in the cavity 146. The spring 150 is sized and shaped to be positioned between the main housing 14 (e.g., the first housing 18 of the main housing 14) and the first button 126, and biases the first button 126 away from the main housing 14. In some examples, the first housing 18 includes a recess, or protrusion, that receives or otherwise facilitates coupling of the spring 150 to the first housing 18. Additionally, in some examples, the first button 126 does not include a cavity 146 that receives the spring 150. Rather, the spring 150 is positioned against a flat, lower surface of the main body 142, or is otherwise coupled to the main body 142.

With continued reference to FIGS. 5-8, the first button 126 also includes a projection 154 that extends from the main body 142. In the illustrated example, the projection 154 has an L-shaped cross-section, although in other examples the projection 154 may have other shapes and sizes than that illustrated (e.g., C-shaped, U-shaped, and the like). The projection 154 extends at least partially along an axis A5 that is parallel to both the axis A1 and the axis A3 seen in FIG. 9. The portion of the projection 154 that extends along the axis A5 is spaced from the main body 142.

With reference to FIGS. 9-14, the first button 126 is moveable between a first position (FIGS. 9-11) in which the projection 154 is within the channel 94 of the first knob 70, and a second position (FIGS. 12-14) in which the projection 154 is outside of the channel 94. The first button 126, in combination with features of the first knob 70, act as a knob rotation locking mechanism.

Figure 10:
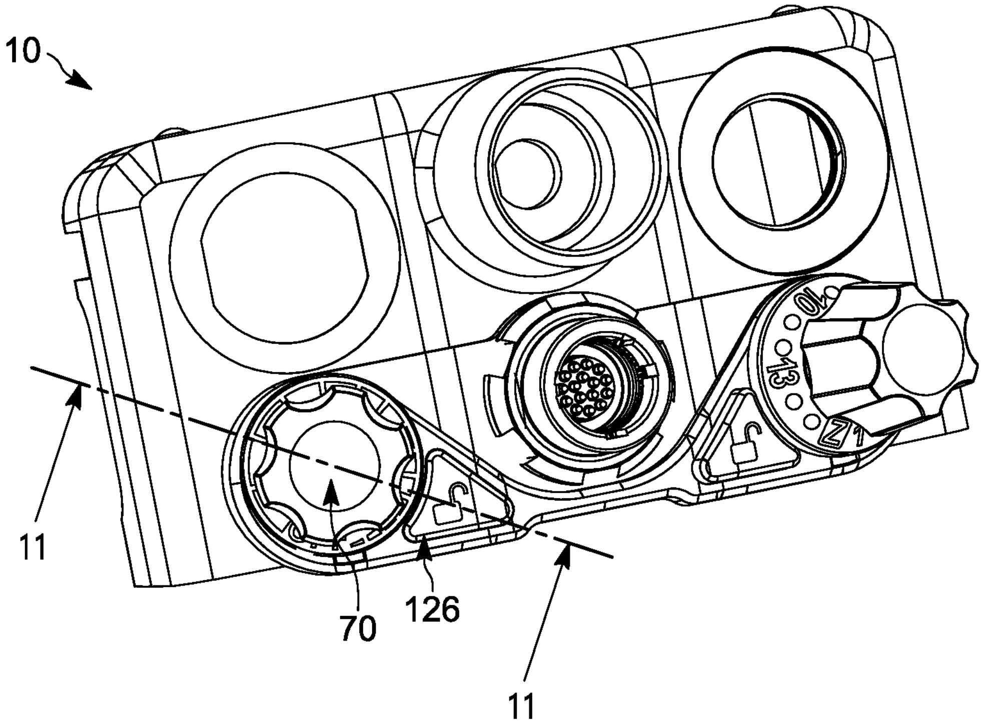
FIG. 10 is a top view of the portable communication device, with the button in the first position.
Figure 11:
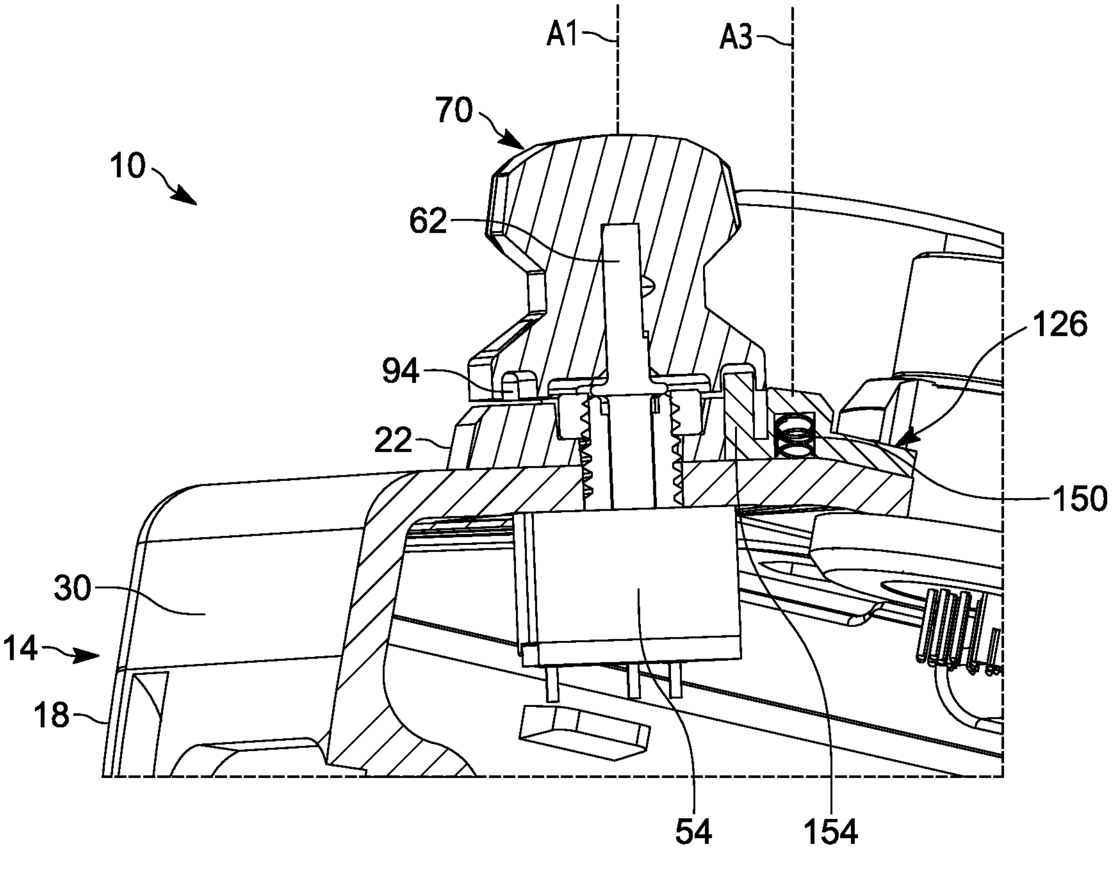
FIG. 11 is a cross-sectional view of the portable communication device, taken along lines 11-11 in FIG. 10, with the button in the first position.

With reference to FIGS. 9-11, when the first button 126 is in the first position, the first button 126 is an outwardly biased state, and extends through the fifth opening 134 in the second housing 22. The projection 154 of the first button 126 extends into the channel 94 of the first knob 70. In this first position, the first knob 70 is free to rotate about the axis A1, within a range of rotation that is dictated by the circumferential extent of the channel 94. As the first knob 70 rotates, the projection 154 slides within the channel 94. However, when the projection 154 reaches the first end 98 of the channel 94, or the second end 102 of the channel 94 (depending on the direction of rotation), the first knob 70 is prevented from rotating further, due to the location of the rib 106. The rib 106 blocks any such further rotation, and thereby prevents the first knob 70 from being rotated to a particular, and protected, rotational position. In the illustrated example, this protected rotational position is an OFF position of the first knob 70. Accordingly, when the first button 126 is in the first position, the first knob 70 is prevented from being rotated to the OFF position. The second knob 74 may similarly include a protected position (e.g., an OFF or ZEROISE position).

Figure 12:
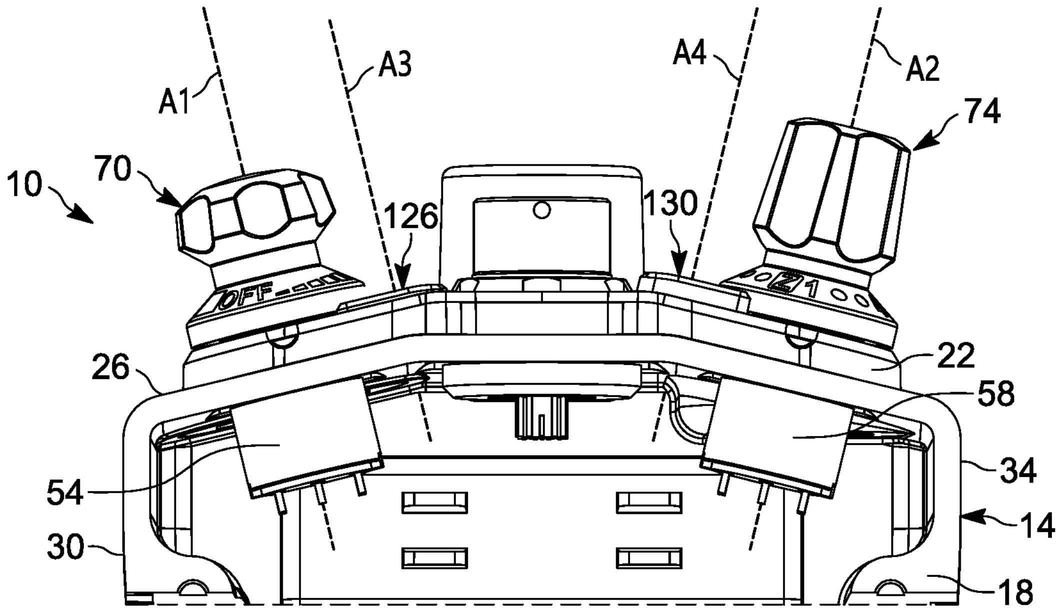
FIG. 12 is a front view of the portable communication device, with the button in a second position.
Figure 13:
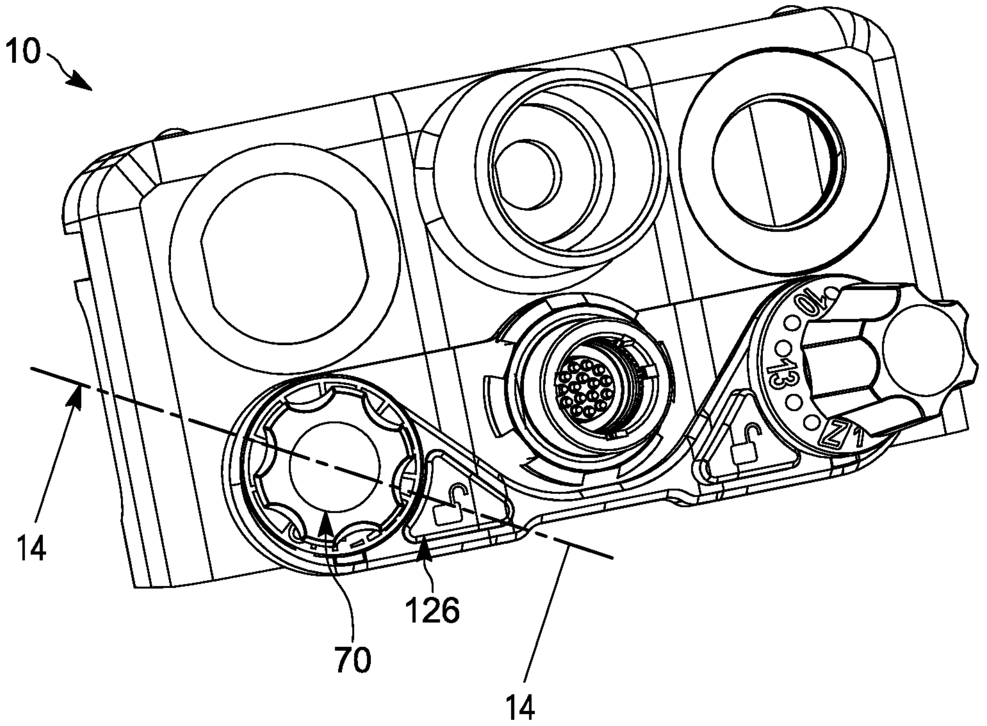
FIG. 13 is a top view of the portable communication device, with the button in the second position.
Figure 14:
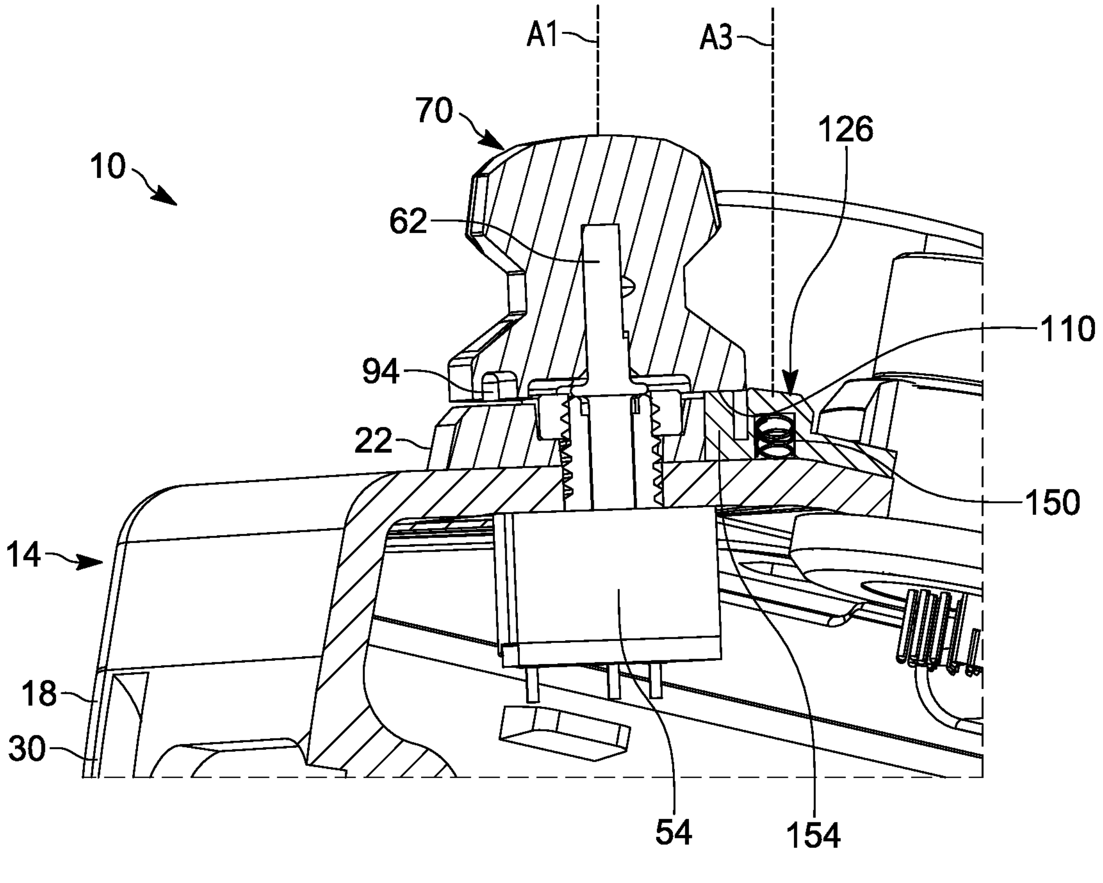
FIG. 14 is a cross-sectional view of the portable communication device, taken along lines 14-14 in FIG. 13, with the button in the second position.

As illustrated in FIGS. 12-14, the first button 126 may be moved to the second position by pressing the first button 126 (e.g., by a finger) downwardly along the axis A3, and against the biasing force of the spring 150. In the second position, the projection 154 is located outside of the channel 94. When the first button 126 is in the second position (and for example is held down by a user's finger), the first knob 70 may then be rotated to any rotational position, including the protected rotational position. For example, as seen in FIG. 14, the first knob 70 may be rotated until the projection 154 is located directly underneath the outer surface 110 of the rib 106. At this time, the first button 126 may be released, and the biasing force of the spring 150 may press the projection 154 to engage against the outer surface 110.

With continued reference to FIGS. 12-14, once the first button 126 has been released, the first button 126 remains in the second position until the first knob 70 is again rotated. For example, if the first knob 70 is rotated clockwise (or counterclockwise), the projection 154 will eventually slip off of the outer surface 110 of the rib 106, and the spring 150 will then force the projection 154 back into the channel 94. Accordingly, the first button 126 may be moved back into the first position by simply rotating the first knob 70 (i.e., without having to physically contact the first button 126).

Overall, the use of the first button 126 and the second button 130 allows for selective control of rotational positions of the first knob 70 and the second knob 74, and inhibits or prevents the user from accidentally moving the first knob 70 and the second knob 74 to predetermined, protected positions (e.g., locks the user from accidentally activating the first knob 70 and the second knob 74 to undesired positions).

In the foregoing specification, specific embodiments, examples, aspects, and features have been described. However, one of ordinary skill in the art appreciates that various modifications and changes can be made without departing from the scope of the subject matter as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises.” “comprising.” “has.” “having,” “includes,” “including,” “contains,” “containing.” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a,” “has . . . a,” “includes . . . a,” or “contains . . . a” does not, without more constraints, preclude the existence of additional identical elements in the process, method, article, or apparatus that comprises, has, includes, contains the element. Unless the context of their usage unambiguously indicates otherwise, the articles “a,” “an,” and “the” should not be interpreted as meaning “one” or “only one.” Rather these articles should be interpreted as meaning “at least one” or “one or more.” Likewise, when the terms “the” or “said” are used to refer to a noun previously introduced by the indefinite article “a” or “an,” “the” and “said” mean “at least one” or “one or more” unless the usage unambiguously indicates otherwise.

The terms “substantially.” “essentially.” “approximately,” “about.” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “one of,” without a more limiting modifier such as “only one of,” and when applied herein to two or more subsequently defined options such as “one of A and B” should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled." "coupling." or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples and embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable communication device comprising:

a main housing;

a knob coupled to the main housing, wherein the knob is rotatable about a first axis that extends into the main housing, wherein the knob includes a channel that extends partially circumferentially about the first axis; and a button coupled to the main housing, wherein the button is moveable linearly along a second axis that is parallel to the first axis, wherein the button includes a projection that is sized and shaped to extend into the channel, wherein the button is movable between a first position in which the projection is within the channel, and a second position in which the projection is outside of the channel.

2. The portable communication device of claim 1, wherein the knob includes a first section sized and shaped to be gripped to rotate the knob, and wherein the knob includes a second section positioned opposite the first section along the first axis, wherein the channel is disposed in the second section.

3. The portable communication device of claim 2, wherein the channel faces the main housing.

4. The portable communication device of claim 1, wherein the channel includes a first end and a second end.

5. The portable communication device of claim 4, wherein the knob includes a rib that separates the first end from the second end.

6. The portable communication device of claim 5, wherein the rib defines a lower surface, and wherein the projection is sized and shaped to contact the lower surface when the button is in the second position.

7. The portable communication device of claim 1, wherein the knob is a volume control knob.

8. The portable communication device of claim 7, further comprising an encoder shaft coupled to the knob, wherein the encoder shaft extends along the first axis, and extends into the knob.

9. The portable communication device of claim 1, wherein the main housing includes a first housing and a second housing coupled to an exterior of the first housing, wherein the second housing is a bezel.

10. The portable communication device of claim 9, wherein the bezel defines an opening sized and shaped to receive the button, wherein the button is moveable along the second axis within the opening.

11. The portable communication device of claim 1, further comprising a spring coupled to the button, wherein the spring is positioned between the main housing and the button, and biases the button away from the main housing.

12. The portable communication device of claim 1, wherein the button includes a main body, wherein the projection extends away from the main body.

13. The portable communication device of claim 12, wherein the projection has an L-shaped cross-section.

14. The portable communication device of claim 12, wherein the main body defines a cavity, and wherein the portable communication device includes a spring positioned partially in the cavity.

15. The portable communication device of claim 12, wherein the projection extends at least partially along a third axis that is parallel to both the first axis and the second axis.

16. The portable communication device of claim 1, wherein the knob and the button are positioned relative to one another such that the knob is rotatable relative to the first axis when the button is in the first position, and wherein the channel is configured to slide over the projection of the button when the button is in the first position.

17. The portable communication device of claim 16, wherein the knob includes a rib that inhibits rotation of the knob to a protected position when the button is in the first position.

18. The portable communication device of claim 17, wherein the knob and the button are positioned relative to one another such that when the button is moved to the second position, the knob is free to rotate to the protected position.

19. The portable communication device of claim 18, wherein the rib defines a lower surface, and wherein the projection is engaged with the lower surface of the rib when the knob is rotated to the protected position.

20. The portable communication device of claim 19, wherein the protected position is an off position of the knob.

* * * * *